United States Patent
Zidan

(10) Patent No.: US 9,325,030 B2
(45) Date of Patent: Apr. 26, 2016

(54) HIGH ENERGY DENSITY BATTERY BASED ON COMPLEX HYDRIDES

(71) Applicant: Ragaiy Zidan, Aiken, SC (US)

(72) Inventor: Ragaiy Zidan, Aiken, SC (US)

(73) Assignee: SAVANNAH RIVER NUCLEAR SOLUTIONS, LLC, Aiken, SC (US)

( * ) Notice: Subject to any disclaimer, the term of this patent is extended or adjusted under 35 U.S.C. 154(b) by 806 days.

(21) Appl. No.: 13/629,753

(22) Filed: Sep. 28, 2012

(65) Prior Publication Data

US 2015/0372342 A1    Dec. 24, 2015

(51) Int. Cl.
| | |
|---|---|
| *H01M 10/26* | (2006.01) |
| *H01M 4/38* | (2006.01) |
| *H01M 4/58* | (2010.01) |
| *H01M 10/052* | (2010.01) |
| *H02J 7/00* | (2006.01) |

(52) U.S. Cl.
CPC ............ *H01M 10/052* (2013.01); *H01M 4/382* (2013.01); *H01M 4/58* (2013.01); *H01M 10/26* (2013.01); *H02J 7/007* (2013.01); *H01M 2300/0037* (2013.01)

(58) Field of Classification Search
None
See application file for complete search history.

(56) References Cited

U.S. PATENT DOCUMENTS

| | | | |
|---|---|---|---|
| 6,471,935 | B2 | 10/2002 | Jensen et al. |
| 6,617,064 | B2 | 9/2003 | Petrie et al. |
| 6,686,076 | B2 | 2/2004 | Johnson |
| 7,153,489 | B2 | 12/2006 | Bingham et al. |
| 2004/0009392 | A1 | 1/2004 | Petillo et al. |
| 2006/0102489 | A1 | 5/2006 | Kelly |
| 2010/0252444 | A1 | 10/2010 | Vajo et al. |
| 2013/0084474 | A1* | 4/2013 | Mills ................ 429/9 |

FOREIGN PATENT DOCUMENTS

| | | |
|---|---|---|
| DE | 11 41 623 B | 12/1962 |
| WO | WO 01/78170 | 10/2001 |
| WO | WO 03/058748 | 7/2003 |
| WO | WO 2005/090229 | 9/2005 |
| WO | WO 2005/097491 | 10/2005 |
| WO | WO 2006/050077 | 5/2006 |
| WO | WO 2006/101214 | 9/2006 |
| WO | WO 2006/114728 | 11/2006 |
| WO | WO 2007/112203 | 10/2007 |
| WO | PCT/US2008/009536 | 8/2008 |
| WO | WO 2009/054874 | 4/2009 |

OTHER PUBLICATIONS

U.S. Appl. No. 11/891,125, filed Aug. 9, 2007, Zidan.
Bogdanovic & Schwickardi, "Ti-doped Alkali Metal Aluminum Hydrides as Potential Novel Reversible Hydrogen Storage Materials," Journal of Alloys and Compounds, vol. 253-254, 1997, p. 1-9.
Jensen et al, "Advanced Titanium Doping of Sodium Aluminum Hydride: Segue to a Practical Hydrogen Storage Material?" Hydrogen Engery, vol. 24, 1999, p. 461-465.

(Continued)

*Primary Examiner* — Patrick Ryan
*Assistant Examiner* — Christopher Domone
(74) *Attorney, Agent, or Firm* — J. Bennett Mullinax LLC

(57) ABSTRACT

A battery and process of operating a battery system is provided using high hydrogen capacity complex hydrides in an organic non-aqueous solvent that allows the transport of hydride ions such as $AlH_4^-$ and metal ions during respective discharging and charging steps.

7 Claims, 5 Drawing Sheets

(56) References Cited

OTHER PUBLICATIONS

Zidan et al, "Hydrogen Cycling Behavior of Zirconium and Titanium—Zirconium-Doped Sodium Aluminum Hydride," Journal of Alloys and Compounds, vol. 285, 1999, p. 119-122.

Bogdanovic et al, "Metal-doped Sodium Aluminium Hydrides as Potential New Hydrogen Storage Materials," Journal of Alloys and Compounds, vol. 302, 2000, p. 36-58.

H. Senoh et al: "Electrochemical reaction of lithium alanate dissolved in diethyl ether and tetrahydrofuran", J. Power Sources vol. 164, Nov. 17, 2006, pp. 94-99, XP002527187 paragraph [0004]; table 1.

European Patent Office, International Search Report, PCT/US2008/009536, Jun. 4, 2009, Rijswijk, NL, 7 pages.

European Patent Office, Written Opinion, PCT/US2008/009536, Jun. 4, 2009, Munich, DE, 7 pages.

Alpatova, N. M. et al, "Physicochemical Properties and Structure of Complex Compounds of Aluminium Hydride", Russian Checmial Reviews, 37 (2), 1968, Institute of Electrochemistry, Academy of Scienses of the USSR, Kurnakov Institute of General and Inorganic Chemicstry, Academy of Sciences, Moscow, pp. 99-114.

Zidan, et al. "Aluminum Hydride: a revsersible materail for hydrogen storage"; The Royal society of Chemistry 2009; Chem. Commun., 2009, 3717-3719.

Oumellal, et al. "Metal Hydrides for lithium-ion batteries"; Macmillian Publishers Limited; nature materials/vol. 7/Nov. 2008/www.nature.com/nature materials; pp. 916-921.

* cited by examiner

Example of LiAlH$_4$ Dissolved in THF Battery system

Electrodes in this case are Lithium and a Metal Hydride

HIGH ENERGY DENSITY BATTERY BASED ON COMPLEX HYDRIDES

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention is directed to a high energy density hydrogen lithium battery and alkaline metal battery using complex hydrides and appropriate solvents to store electrical energy.

BACKGROUND OF THE INVENTION

The future use of electrical energy depends in general on the development of the next generation of electrical energy storage systems and in particular on the development of high energy density batteries. The advent of high energy and economically viable rechargeable batteries is expected to usher the next revolution in wireless portable devices and allow the expansion of hybrid electric vehicles to plug-in hybrid electric vehicles and all-electric vehicles. High energy density multi-electron batteries are critically needed to enable the effective use of alternative energy sources such as solar and wind. Recent advances in Li batteries have revolutionized the electronic industry. Further advances in the filed of batteries is need to achieve inexpensive, safe and high energy density storage system that can relay other metals beside Li.

Heretofore, high energy density batteries have involved either the movement of hydrogen such as a metal hydride battery or involved the movement of lithium in lithium batteries. While such battery designs are operative for any electrical components, there remains room for variation and improvement in the art.

SUMMARY OF THE INVENTION

It is one aspect of at least one of the present embodiments to provide for electricity storing battery system using high hydrogen capacity complex hydrides and an organic solvent such THF, etherates and Amines that allows the transport of hydride ions such as $AlH_4^-$ ions and metal ions such as $Li^+$, resulting in a cost effective high energy battery.

It is a further aspect of at least one of the present embodiments of the invention to provide for a battery system in which alanates such as $NaAlH_4$ or $LiAlH_4$, in combination with a polar solvent such as THF which allows for the oxidation and direct formation of alane-THF adduct ($AlH_3$:THF) and the reduction of metal ions to metal (e.g. $Li^+$ to Li or $Na^+$ to Na) during charging. Hydrogen ion from a hydride electrode is transported to the ($AlH_3$:THF) in the solvent acting as an electrolyte to form ($AlH_4^-$:THF) which reacts with the metal at the anode electrode to form the alanates back during discharging. Other complex hydrides beside $NaAlH_4$ and $LiAlH_4$ can be used such as $KAlH_4$, $Ca(AlH_4)_2$, $Mg(AlH_4)_2$.

It is another aspect of at least one of the present embodiments to provide for an electrochemical energy storing cell through formation of ($AlH_3$:THF) using alanates such as $LiAlH_4$ or $NaAlH_4$ dissolved in a polar solvent and using one electrode made out of a metal hydride and the other electrode made out of metals such as Li or Na embedded in graphite or conducting polymer.

It is another aspect of at least one of the present embodiments to provide for an electrochemical energy storing cell that can be tuned to the required voltage for a specific application by the choice of complex hydrides such as, $LiAlH_4$, $NaAlH_4$, $KAlH_4$, $Ca(AlH_4)_2$, $Mg(AlH_4)_2$. The reduction of ions such as $Li^+$, $Na^+$, $Mg^+$, $Ca^+$ and $K^+$ to metals requires different voltages depending on the metal and resulting in different batteries with different voltages for different applications.

It is yet another aspect of at least of one of present embodiments to provide a process of using an electrolytic cell to store energy efficiently by using an electrolytic cell.

One aspect of at least one embodiment of the present invention is directed towards use of electrochemical cells to produce a battery system based on using high hydrogen capacity complex hydrides such as, but not limited to, $AlH_3$, $LiAlH_4$, $Mg(AlH_3)_2$, $Ca(AlH_4)_2$, $LiBH_4$ etc. to obtain high energy density and multi-electrons batteries such as in hydrogen lithium batteries.

Another aspect of at least one embodiment of the present invention is further directed to using an electrolytic cell for a battery system which uses polar solvent and other similar organic solvents that allow for more efficient ion transport in the high density battery.

Another aspect of at least one embodiment of the present invention is further directed to using an electrolytic cell for a battery system which uses polar and other similar organic solvents that allow for ion transport of metals such Na, K, Ca and does not limit the battery to just the use of Li.

Another aspect of at least one embodiment of the present invention is further directed to using hydride electrodes in the battery system that allow for moving multi-electrons based on the oxidation state of the metal of the hydride to obtain high energy density.

Another aspect of at least one embodiment of the present invention is further directed to an electrolytic process of forming metal hydrides using polar solvents in which complex hydrides such as $AlH_3$, $LiAlH_4$, $Mg(AlH_3)_2$, $Ca(AlH_4)_2$, $LiBH_4$ are dissolved.

Another aspect of at least one embodiment of the present invention is directed toward an apparatus and process for electrolyzing an electrolyte comprising complex hydrides and appropriate solvents in order to store electric energy.

It is another aspect of at least one embodiment of the present invention to provide an alane/Li-ion battery in which the oxidation state of a metal in the metal hydride electrically increases the number of electrons by exchanges with $AlH_4$—.

It is another aspect of at least one embodiment of the present invention to provide for a high density battery in which an electrolyte can be maintained in a solid state, such as $LiAlH_4$ or $LiBH_4$ compressed powder between the electrodes.

It is another aspect of at least one embodiment of the present invention to provide an electrolytic process for providing an improvement of energy storage efficiency as a use of a catalytic additive of a halide of the formula MX where M=Li, or Na and X=F, Cl, Br and I.

It is another aspect of at least one embodiment of the present invention to provide an electrolytic process in which a non-aqueous electrochemical cell uses either one of an alkali metal or an alkali metal alanate dissolved in an aprotic solvent and at least one electrode in a zero valance state that will form a hydride. Suitable complex hydrides include $AB_5$, and complex hydrides according to the formula of $MBH_4$ and $MNH_2$ where M is a metal.

It is another aspect of at least one embodiment of the present invention to provide a battery and a process that uses a favorable oxidation state of a metal in a metal hydrate electrode to incorporate the number of electrons by increasing the number of $AlH_4^-$ ions exchanged.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Figure 1:
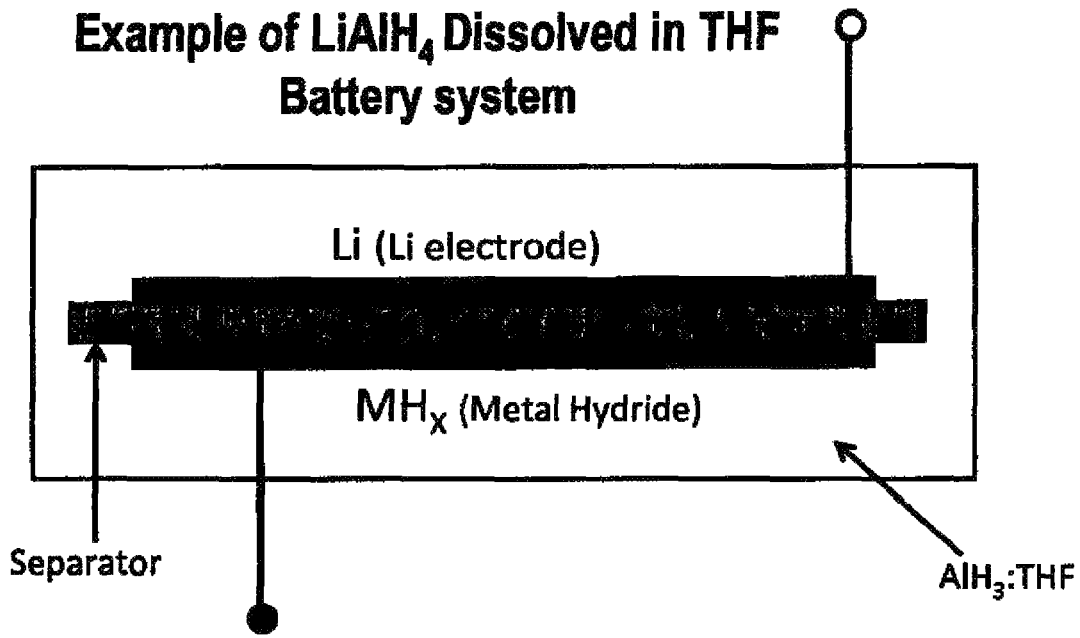
FIG. 1 is a schematic diagram describing the process of a reversible battery system for energy storage

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

This disclosure directed to a novel battery and process for which the battery operates in reverse of an alane production process such as that described in U.S. patent application having Ser. No. 13/136,864 filed on Aug. 12, 2011 entitled "Enhancing Electrochemical Methods for Producing and Regenerating Alane by Using Electrochemical Catalytic Additives". The entire referenced application is incorporated herein by reference for all purposes.

In accordance with the present invention, it has been found that a complex hydride such as $NaAlH_4$, $LiAlH_4$, $LiBH_4$, $NaBH_4$, $KAlH_4$ and similar compounds may be dissolved in a polar solvent such as THF within an electrolytic cell. The use of an organic solvent prevents the oxidation of the components of the battery and forms an electrolyte and allows ion transfer in the battery. The dissolved complex hydride in the polar solvent produces an electrolyte which may transfer ions. The electrolytes can be varied to bring about different battery voltage. For instance, the use of a potassium or sodium containing complex hydride might operate at approximately 1.6 volts which is significantly lower than the 3-volt levels of the conventional lithium battery. However, the sodium and/or potassium complex hydrides are much less expensive than lithium compounds. Further, in applications where there is adequate space, a potassium or sodium complex hydride based battery can be utilized in parallel so as to achieve higher voltages at less expense. The example below of $LiAlH_4$ in THF or ether is used for explanation and not for limitations.

A cathode is used of a metal hydride ($MH_x$) where $MH_x$ is a metal hydride and x is number of hydrogen atoms in the hydride and is also the oxidation state of the metal. The cathode can be in different forms such as a film, pellets, or particles embedded in a conductive adhesive such as graphite or pellets, During charging, $AlH_4^-$ ions are interacting with a metal electrode such as $Mg_2Ni$ or $LaNi_5$ and forming a metal hydride such as $Mg_2NiH_4$ or $LaNi_5H_6$. The result of this interaction is the formation of an $AlH_3$ adduct such as $ALH_3$: THF or $AlH_3$ etherates or $AlH_3$:amines dissolved in the polar solvent. During charging $Li^+$ ions are reduced to a Li metal. During discharge, the metal hydride provides a $H^-$ ion forming $AlH_4^-$ reacting with Li at the anode to form $LiAlH_4$.

Example 1

The charging/discharging is illustrated in the schematic in FIG. 1. In the example seen in FIG. 1, $LiAlH_4$ is the electrolyte which is dissolved in THF. The electrolyte is ionized when a potential is applied to the battery to produce a lithium ion ($Li^+$) and an aluminum hydride ion ($AlH_4^-$) at the respective cathode and anode. One electrode in this example is made of lithium-based materials or lithium accommodating materials such as a lithium metal, lithium intercalated carbon, and other lithium compounds. The other electrode is made of a metal hydride material that have a metal hydride embedded in them such as $AB_5$, $AB_2$, complex hydrides, and other metal hydrides which may be embedded in graphite or other conducting materials. A combination of the Li and hydrogen allows a high voltage to result between the lithium ion and the lithium metal and to attaining a high capacity result by using the hydrogen from hydrides with a high hydrogen capacity and energy density. The charging and discharging of the battery in reference to the FIG. 1 are shown, for example, in the accompanying equations set forth in FIG. 1.

The metal hydride can be $Mg_2Ni$, $LaNi_5$ or other high capacity hydrides such $MgH_2$ or alloys such as TiFe. Such materials allow for more energy density and take advantage of the non-aqueous electrolyte where some of the high capacity hydrides can be used as electrodes.

Example 2

Figure 2:
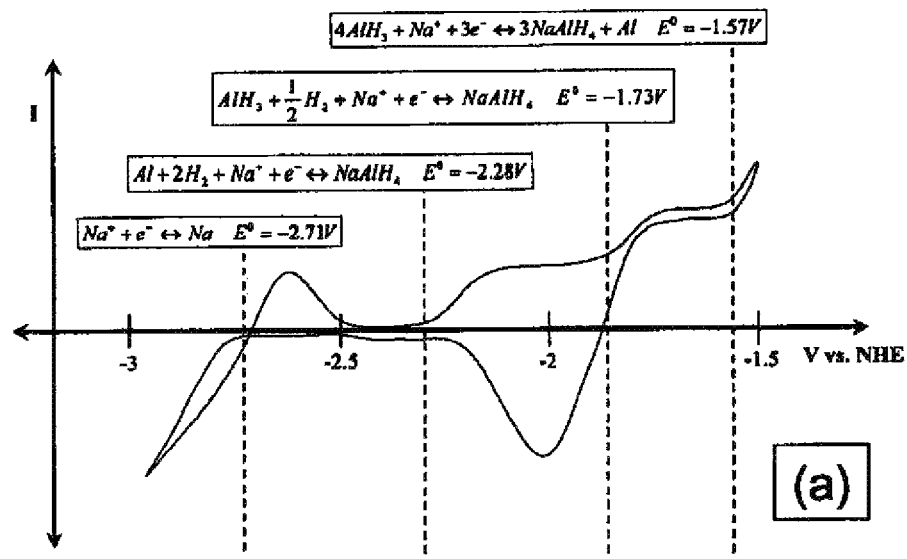
FIGS. 2A and 2B are schematic diagrams of theoretical and experimental cyclic voltammagrams for the electrochemical formation transport of ions and the possible reactions and voltages
Figure 2:
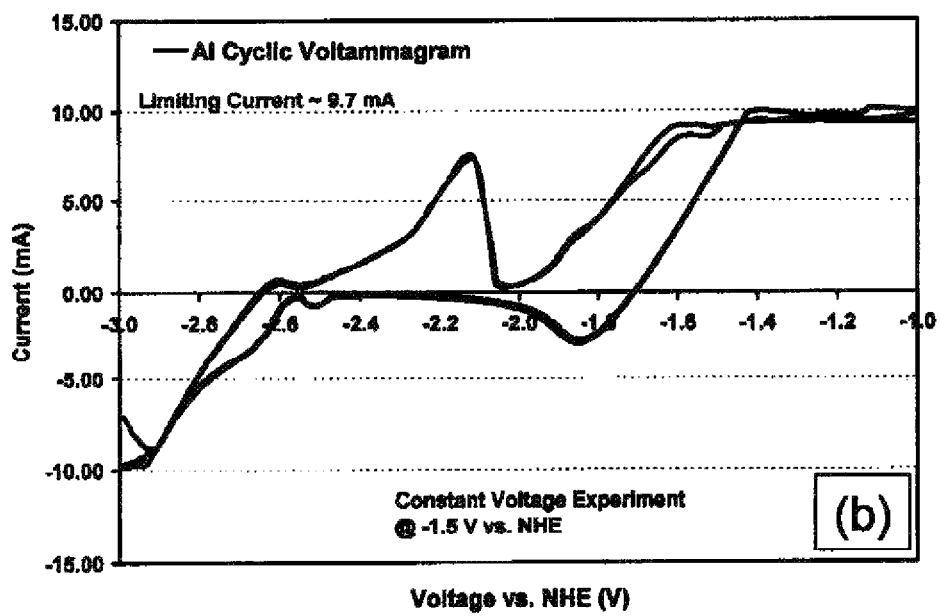

Using $NaAlH_4$ as an example of an electrolyte, FIGS. 2A and 2B depict experimental and theoretical cyclic voltammagrams for the electrochemical formation of alane. FIG. 2(a) illustrates a theoretical cyclic voltammagram which was formulated from the equilibrium potential data for possible reactions and the anticipated state of each species generated. FIG. 2(b) illustrates a bulk electrolysis experiment where an aluminium wire electrode for a cell containing a 1.0 M solution of NaAlH$_4$ in THF at 25° C. was employed. The CV shows an unexpected reduction current above the −2.71 V equilibrium potential for the Na/Na$^+$ reaction. This current can be explained by the generation of Na$_3$AlH$_6$. The onset potential of the NaAlH$_4$ decomposition reaction to Al is shifted to approximately −2.05 V vs. SHE. The over 250 mV shift in potential indicates a high overpotential for the decomposition reaction. A limiting current of 9.7 mA was reached near −1.5 V.

Example 3

In this example, LiAlH$_4$ was used instead of NaAlH$_4$. Both, tetrahydrofuran (THF) and diethyl ether (Et$_2$O) were used as aprotic solvents (AS) for the charging discharging. The nature of the solvents and degree of dissociation of MAlH$_4$ in AS (AS=THF, Et$_2$O) affect the performance and the voltage. At ambient conditions LiAlH$_4$ is dissolved in the solvent giving an electrolyte solution. The degree of dissociation of LiAlH$_4$ ranges from completely solvated ions at low concentrations to triple ions at high concentrations.

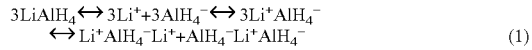

$$3LiAlH_4 \leftrightarrow 3Li^+ + 3AlH_4^- \leftrightarrow 3Li^+AlH_4^- \leftrightarrow Li^+AlH_4^-Li^+ + AlH_4^-Li^+AlH_4^- \quad (1)$$

Electrochemical impedance spectroscopy (EIS) was performed for cells containing these solutions.

Figure 3:
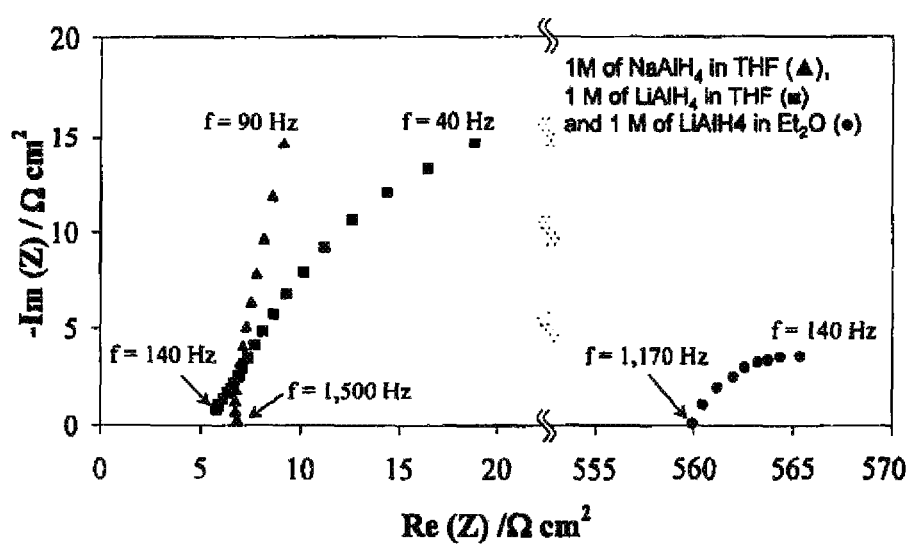
FIG. 3 is a comparative Nyquist diagram for identical electrochemical battery cells with different electrolytes and different voltages 1 M of $NaAlH_4$ in THF, 1 M of $LiAlH_4$ in THF and 1 M of $LiAlH_4$ in $Et_2O$

FIG. 3 shows the Nyquist diagram for identical electrochemical cells using 1 M solutions of LiAlH$_4$ in THF and Et$_2$O and it is compared to NaAlH$_4$ in THF. The high frequency intercept represents the resistance of the electrochemical cell. Accordingly, the results show that the cell with NaAlH$_4$-THF has a slightly higher resistance (6.8 Ω·cm$^2$) than the cell with LiAlH$_4$-THF (5.8 Ω·cm$^2$). However, the cell with LiAlH$_4$-Et$_2$O has two orders of magnitude higher resistance (560 Ω·cm$^2$) than the cells with THF. THF has a higher dielectric constant than Et$_2$O which contributes to the smaller resistance of the cell. This is desirable because it allows the use of higher currents and increases the ion exchange.

Example 4

Figure 4:
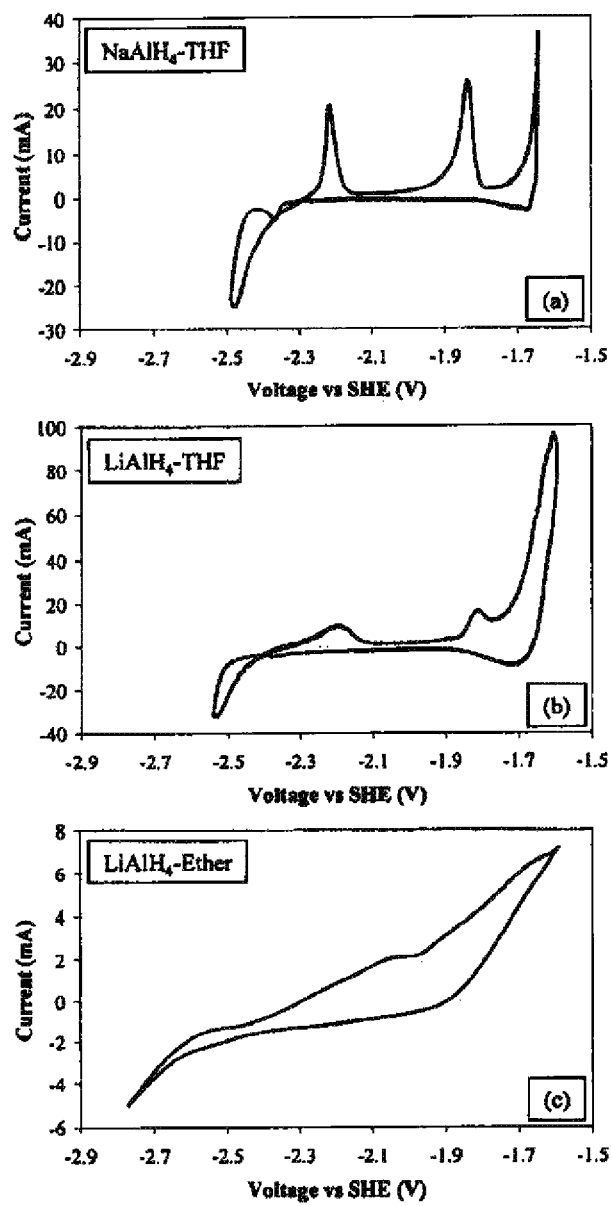
FIGS. 4A and 4B are Cyclic voltammograms at 10 mV/s for the charging and discharging using identical electrochemical cells with 1 M of $NaAlH_4$ in THF (a), 1 M of $LiAlH_4$ in THF (b) and 1 M of $LiAlH_4$ in $Et_2O$ (c).

Using polar THF as a solvent provides stronger adducts with an alane (i.e. AlH$_3$.nTHF), such that the alane adduct remains dissolved during the electrolysis allowing for ions to follow during charging discharging and particularly during the interaction of AlH$_4^-$ with Li during discharge to obtain LiAlH$_4$ which is used for the next charging step. FIGS. 4A-4C show cyclic voltammograms (CVs) for identical electrochemical cells using 1 M solutions of MAlH$_4$ (M=Na, Li) in THF and LiAlH$_4$ in Et$_2$O. The CVs were corrected for the ohmic losses of the electrolyte using the resistance obtained in FIG. 3. Comparison of the cells with MAlH$_4$ in THF (FIGS. 4a and 4b) shows that analogous reactions for both cells take place at the same potentials. The higher currents obtained for the cell with LiAlH$_4$-THF are due to the slightly lower resistance of the solution. While the cells with THF show more well defined peaks corresponding to reactions prevailing at a specific potentials, the cell with LiAlH$_4$-Et$_2$O (FIG. 4c) shows more of the reactions occurring simultaneously. The CVs also suggest formation of a strong bonded AlH$_3$.nTHF adduct versus AlH$_3$.nEt$_2$O adduct. Increase in the current is observed at potentials higher than −2 V representing the oxidation of MAlH$_4$ to produce alane-adduct. However, the negative currents corresponding to the reduction of alane back to MAlH$_4$ decreased to zero for the cells with THF but not for the cell with Et$_2$O. The AlH$_3$.nTHF adduct formed during the oxidation of MAlH$_4$ is stable at these reduction potentials compared to the weaker AlH$_3$.nEt$_2$O adduct, releasing the alane to form MAlH$_4$. However, adding a hydrogen from the metal hydride electrode forms AlH$_4^-$:Adduct (THF or ET$_2$O). Then the AlH$_4^-$:Adduct+Li$^-$→LiAlH4+e$^-$ reaction provides electricity in the discharge step.

Example 5

Figure 5:
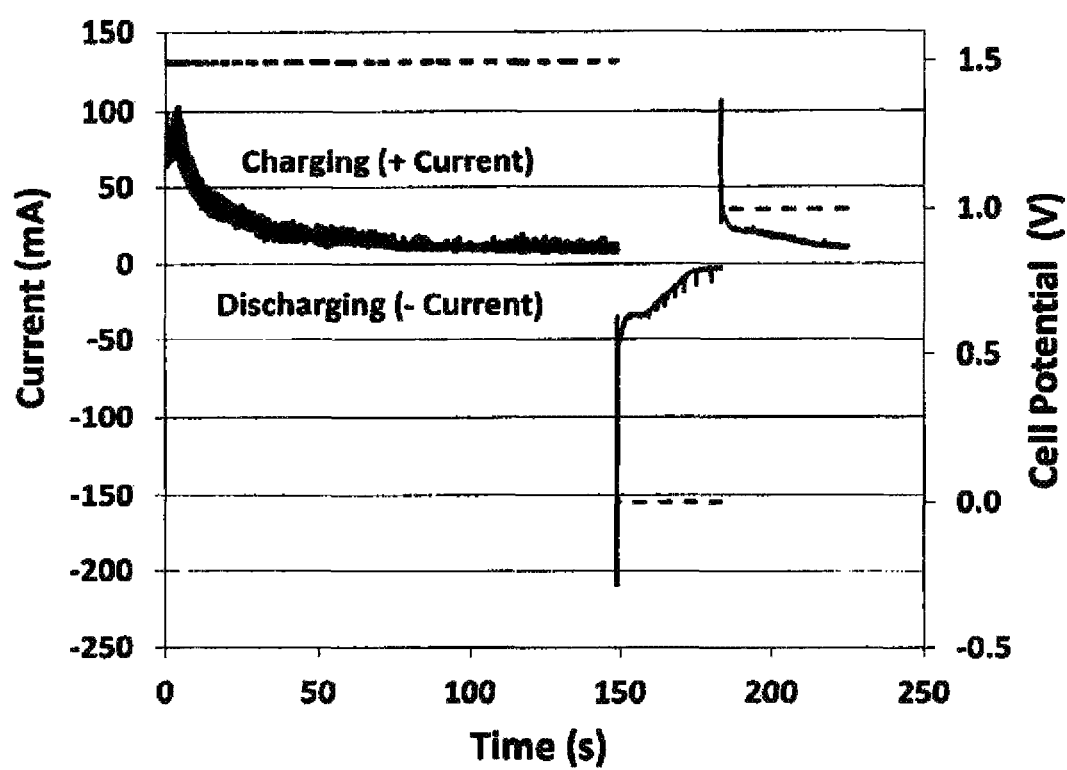
FIG. 5 is a graph indicating the charging and discharging of electrochemical cells with $AB_5$ and aluminum electrodes and an electrolyte of $LiAlH_4$ in ether.

FIG. 5 illustrates the ability to charge and discharge a non-aqueous electrochemical cell having either an alkali metal or alkali earth metal alanate dissolved in a polar, aprotic solvent and with at least one electrode in the zero valence state that is known to form a hydride. During charging, the zero valence of the hydride forming electrode will be the anode. At the anode, the hydride forming material will be oxidized to form the hydride and alanate anions in the electrolyte will transfer a hydride anion(s) to the electrode and form aluminum hydride (alane) or an alane adduct that remains in the electrolyte. At the cathode, the alkali metal or alkali earth metal cations are reduced to their metallic form. During discharge, the hydride electrode (now the cathode) will be reduced to the metallic state and the hydride anion will recombine with alane to form an alanate anion. The metallic alkali metal or alkali earth metal will be oxidized to form cations that go into solution. FIG. 5 shows that representative reversible electrochemical cells using these electrochemical reactions. The alanate utilized is AB$_5$ using an electrolyte of LiAlH$_4$ in ether and using aluminum electrodes. The same process can be utilized using other complex hydrides MBH4, MNH2, where M is a metal.

As set forth in the examples above, a battery and process of offering a battery is provided in which it is possible to move hydride ions in non-aqueous solutions as part of the battery charging and discharging process.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the claims of the present invention. In addition, it should be understood that aspects of the various embodiments may be interchanged, both in whole, or in part. Therefore, the spirit and scope of the invention should not be limited to the description of the preferred versions contained therein.

What is claimed is:

1. A complex hydride battery comprising:
    a cathode comprising a metal hydride according to the formula (MH$_x$) where M is a metal and X further represents an oxidation state of the metal;
    an anode comprising a lithium metal; and
    an electrolyte comprising a complex hydride, the complex hydride is selected from the group consisting of LiAlH$_4$, NaAlH$_4$, KAlH$_4$, Ca(AlH$_4$)$_2$, Mg(AlH$_4$)$_2$, LiBH$_4$, and NaBH$_4$, dissolved in an organic solvent selected from the group consisting of THF, ethers, amines and mixtures thereof to allow for the transport of the complex hydride's corresponding hydride ions selected from the group consisting of AlH$_4$ ions and BH$_4$ ions.

2. A complex hydride battery comprising:
a cathode comprising a metal hydride according to the formula $(MH_x)$ where M is a metal and X further represents an oxidation state of the metal;
an anode comprising a lithium metal; and
an electrolyte comprising a compressed complex hydride powder positioned between the anode and the cathode, the complex hydride is selected from the group consisting of $LiAlH_4$ and $LiBH_4$, to allow for the transport of the complex hydride's corresponding hydride ions selected from the group consisting of $AlH_4$ ions and $BH_4$ ions.

3. A process for charging and discharging a battery comprising the steps of:
providing a complex hydride battery having:
a cathode comprising a metal hydride according to the formula $(MH_x)$ where M is a metal and X further represents an oxidation state of the metal;
an anode comprising a lithium metal; and
an electrolyte comprising a complex hydride, the complex hydride is selected from the group consisting of $LiAlH_4$, $NaAlH_4$, $KAlH_4$, $Ca(AlH_4)_2$, $Mg(AlH_4)_2$, $LiBH_4$, and $NaBH_4$, dissolved in an organic solvent selected from the group consisting of THF ethers, amines and mixture thereof;
reducing metal ions to the metal during a charging step; and,
transporting a hydride ion, the hydride ion selected from the group consisting of a $AlH_4$ ion and a $BH_4$ ion, to the electrolyte and further reacting the hydride ion with the metal at the anode during a discharging step.

4. The complex hydride battery according to claim 1 wherein the organic solvent comprises a polar solvent.

5. The complex hydride battery according to claim 1 wherein the anode of the lithium metal is embedded in a conducting polymer.

6. The process of charging and discharging a battery according to claim 3 wherein the anode of the lithium metal is embedded in a conducting polymer.

7. The process of charging and discharging a battery according to claim 3 wherein the providing step further comprises choosing the complex hydride based on the voltage to be generated by the battery for a specific application.

* * * * *